EXPOSURE CONTROLLER HAVING PLURALITY OF CAPACITORS

Filed Dec. 27, 1966 2 Sheets-Sheet 1

INVENTOR
GOTTFRIED KONIG
BY Young & Thompson
ATTYS

EXPOSURE CONTROLLER HAVING PLURALITY OF CAPACITORS

Filed Dec. 27, 1966 2 Sheets-Sheet 2

INVENTOR
GOTTFRIED KONIG
BY Young + Thompson
ATTYS 3,525,868

EXPOSURE CONTROLLER HAVING PLURALITY OF CAPACITORS

Gottfried Konig, Dresden, Germany, assignor to VEB Pentacon Dresden Kamera- und Kinowerke, Dresden, Germany Filed Dec. 27, 1966, Ser. No. 605,061
Int. Cl. H01j *39/12*
U.S. Cl. 250—214 5 Claims

ABSTRACT OF THE DISCLOSURE

The photographic printing apparatus has a photo electric cell which may be connected to any one of a series of time constant capacitors so that the voltage function appearing across the selected capacitor is applied to an amplifier. The amplified signal is fed to a threshold switch which operates a relay controlling the printing apparatus lamp. In this manner the length of exposure is determined according to the level of illumination of the photographic paper being exposed.

BACKGROUND OF THE INVENTION

The invention relates to a time switch device, particularly for photographic printing apparatus, with a charging capacitor influenced by a photo-electric cell and with an electronic threshold switch.

In such devices the timing device usually acts directly on the grid of a thyratron of which the anode circuit contains a relay through which current flows when the ignition voltage is reached and which operates contacts which switch off the printing lamp or which actuate a shutter that can be pivoted into the path of the printing rays. As thyratrons are relatively low impedance devices, low charging currents, in conjunction with photo-electric cells of high ohmic resistance influencing the charging current curve and lead to considerate switching time inconsistencies.

The charging current can be increased by using a secondary electronic amplifier in place of a photo-electric cell. These devices, however, necessitate the use of a very expensive high voltage part and the adoption of special safety measures for the high voltage, in addition to involving far higher expenditure than photo-electric cells.

The use of a secondary electronic amplifier can be avoided if the thyratron is preceded by an impedance converter in the form of a cathode follower or an electrometer valve. Systems are also known in which an impedance converter of this kind is followed by a Schmitt trigger operating as a threshold switch.

It is true that the switching principles last mentioned make it possible to avoid the switching time inconsistencies resulting from incorrect impedance matching, but they are naturally still subject to the switching time inconsistencies caused by the threshold switch itself. In contrast to a thyratron, the switching accuracy of other known threshold switches, such as an oscillator circuit or a Schmitt trigger, is comparatively high but it is still inadequate, particularly for colour printing apparatus.

The purpose of the present invention is to provide a time switch device of the type mentioned at the beginning and resulting in dispersion values considerably below that of known threshold switches. The aim of the invention is therefore the conversion of the threshold voltage of ordinary threshold switches to considerably high threshold voltages of comparatively high accuracy by means of a suitable circuit, in addition to which the latter is to provide a wide time range.

SUMMARY OF THE INVENTION

According to the invention we provide a time switch circuit comprising in combination:

(a) a power source,
(b) a photoelectric cell,
(c) a time constant capacitor connected in series with said photoelectric cell across said power source,
(d) a potentiometer system also connected across the power source and having a slider thereon,
(e) an electrometer valve connected in the circuit, of which valve the grid bias voltage is determined by the voltage appearing between the slider and the junction between said photoelectric cell and said time constant capacitor,
(f) an electronic threshold switch, which changes from a first state to a second state at a predetermined input voltage, connected to the output of said electrometer valve, and
(g) a power switch connected to the output of said threshold switch; wherein the circuit values are so selected that the electrometer valve can suppress the initial part of the voltage function appearing across the time constant capacitor and can transfer the part of the voltage function in which there is a level at which said threshold switch changes from said first state to its second state.

In a particularly suitable version of the invention the grid bias voltage for the electrometer valve is tapped off from a high voltage source by means of a potentiometer the slider of which is connected to the cathode of the electrometer valve and also with the negative pole of a low tension source, said low tension source also supplying the anode voltage for the electrometer valve and the working voltages for the threshold switch.

The limit switch following the amplifier stage can consist in a known manner, of an oscillator of which on commencement of oscillation is retarded but supplies a switching impulse for a thyratron which functions as a power switch and which in the known manner, controls a relay which actuates the printing lamp or a shutter which interrupts the rays of this latter. In an alternative version, however, it is possible for the threshold switch following the amplifier stage to be constructed as a trigger stage, for example Schmitt trigger, which directly controls the relay by which the exposure process is switched off.

BRIEF DESCRIPTION OF THE INVENTION

The invention will now be described by way of examples with reference to the accompanying drawings, in which the circuit is used for controlling the exposure time in a photographic printing apparatus (not shown).

DESCRIPTION OF PREFERRED EMBODIMENTS

Figure 1:
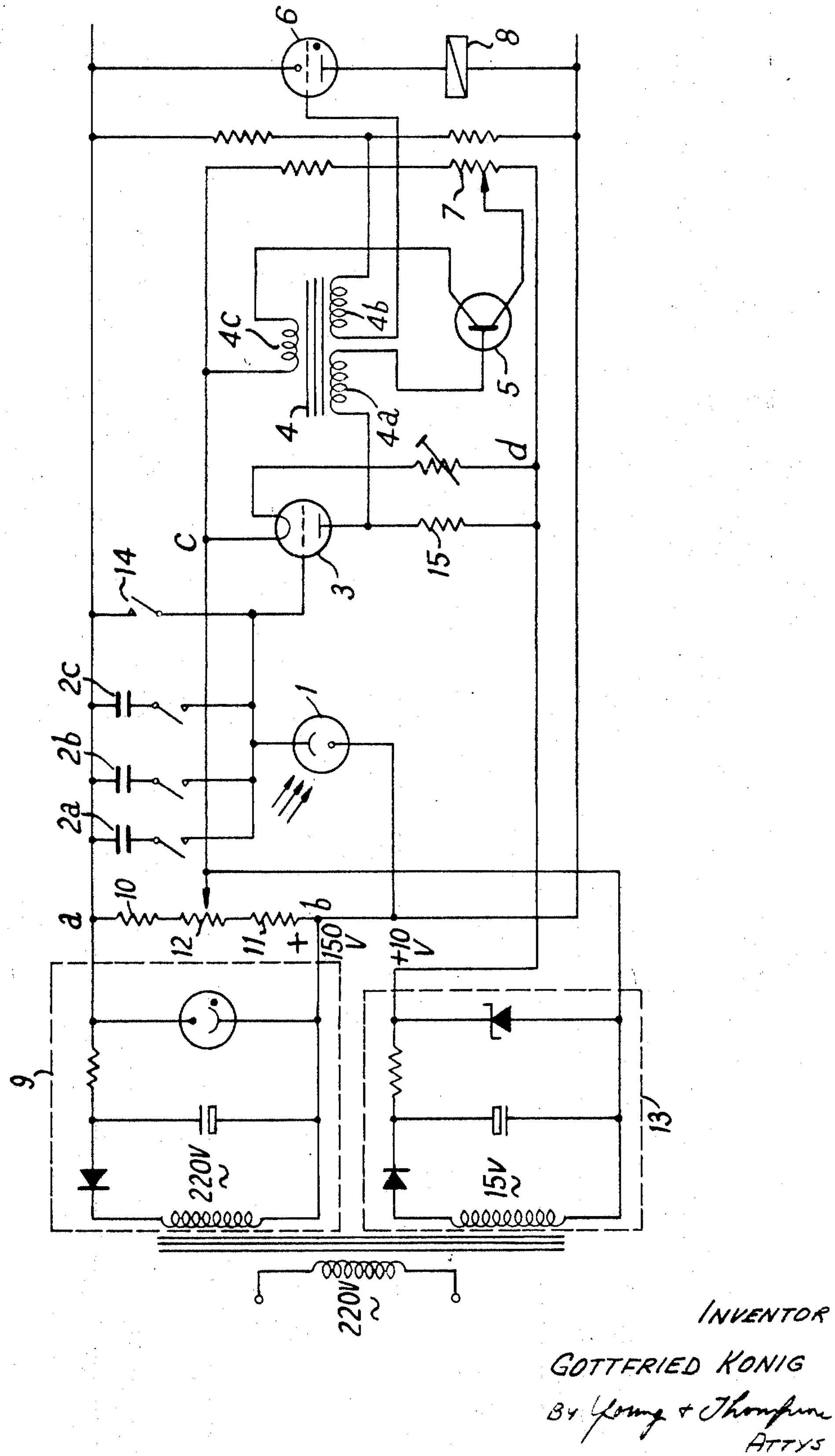
FIG. 1 shows a circuit arrangement in which the threshold switch consists of an oscillator which is followed by a thyratron operating as a power switch.

The timing device consists of photo-electric cell 1 positioned in the region of the photographic paper to be exposed and of various time constant capacitors 2*a–c* which can be connected up to the said cell. The anode of the photoelectric cell 1 is connected with the grid of an electrometer valve 3. To the anode of the electrometer valve 3 is connected one secondary winding 4*a* of a transformer 4, this winding being connected to the base of an oscillator transistor 5, while a further secondary winding 4*b* is connected to the grid of a thyratron 6 operating as a power switch. A potentiometer 7 is used for the adjustment of the threshold voltage of the oscillator transistor 5. The primary winding 4*c* of the transformer 4 is connected in series with the collector of transistor 5. The anode circuit of the thyratron 6 contains a relay 8 which serves, in a known manner and via contacts not shown in the drawing, for the termination of the exposure process, by opening the current circuit of the printing lamp or by energizing the electro-magnet of a shutter by which the path of the printing rays is covered over.

A power pack 9 supplies the charging voltage for the timing device, the grid-bias voltage for the electrometer valve 3 and the grid-bias voltage and anode voltage for the thyratron 6. The output *a* and *b* of the power pack 9 is is bridged by a series resistance combination consisting of the fixed resistances 10 (e.g. 100 kilohms) and 11 (e.g. 250 kilohms) and a potentiometer 12 (e.g. 1 megohm) connected between them. The tap of the potentiometer 12 is connected to the cathode of the electrometer valve 3 and also to the negative pole of the power pack 13. The power pack 13 supplies the anode voltage for the electrometer tube 3 and the working voltages for the oscillator transistor 5.

The time switch device described operates as follows:

FIG. 1 shows the device in its initial state i.e. when the exposure process has not yet been commenced. In this state, starting key 14 is closed. We will assume that the potential on the slider of the potentiometer 12 has been set to an average voltage of 100 v. with respect to point *a*. This results in a negative grid-bias voltage of 100 v. for the electrometer valve 3. The valve is thus completely cut-off. Since, under these circumstances, no voltage drop occurs in its anode resistance 15 (e.g. 10 kilohms), the base emitter section of the oscillator transistor 5 receives no feed current, e.g. the oscillator is unable to oscillate and therefore cannot supply any signal to the grid of the thyratron 6.

On opening of the starting key 14 the printing lamp is switched on, in a manner already known and not shown in the drawings, and one of the time constant capacitors 2*a–c* is connected to the grid of the electrometer valve. As the time constant capacitor which is in circuit charges up via the photoelectric cell 1; at a rate influenced by the level of illumination on the photoelectric cell 1, the potential on the grid to the valve 3 increases. With a voltage to about 90 v. with respect of point *a*, i.e. −10 v. with respect to the cathode, the electrometer valve 3 begins to become conductive. As soon as the voltage, increasing across the anode resistance 15 due to increasing conduction of the valve, exceeds a certain threshold value, i.e. as soon as the base emitter diode of the oscillator transistor 5 becomes conductive, the oscillator stage immediately begins to oscillate. In this connection the threshold value is the sum of the forward voltage (which makes the barrier resistance zero) of the base emitter section and the voltage tapped off by the potentiometer 7, which latter amounts to about 1–3 v. with respect to the point *d*. By the oscillation voltage coupled by the transformer 4 by means of the winding 4*b* the grid potential of the thyratron 6 is increased to the value of the ignition voltage, and the thyratron 6 is thus ignited. The relay 8 is supplied with current and interrupts the exposure process.

A definite voltage V*c* appearing across one of the capacitors 2*a–c* will also appear as an equal grid cathode voltage on valve 3, and this in turn will fix the potential difference across resistor 15, in accordance with the value of the resistor and the characteristic curve of valve 3. As the potential difference across resistor 15 controls the onset of oscillation of oscillator transistor 5, the oscillation commencing when a certain threshold voltage has been reached, it can be seen that the onset of oscillation is dependent on the grid cathode voltage of valve 3, which is the same as the voltage across the time constant capacitor in use. This voltage can be varied by potentiometer 12 within a range of about 10–125 v., in the event of a charging voltage of 150 v. This range is large enough not only to take into account any factors within the timing circuit for which correction must be made, but also to give a wide range of available time settings per time constant capacitor, thereby minimising the number of these capacitors.

The time cycle of the time switch device according to the invention is made up of two periods, a first period $T_1$, during which the amplifier transmits no signal, i.e. is cut-off, and a second period $T_2$ in the vicinity of the switching point of the threshold switch during which valve 3 begins to conduct, and a voltage increasing from zero is applied to the threshold switch, which operates when a particular voltage is reached. The accuracy of the threshold switch thus only directly affects period $T_2$ which period is considerably shorter than $T_1$.

In considering the entire system made up of amplifier valve and threshold switch, however, the accuracy of this time range T2 can be related to the total time $T1+T2$, since during the time T1 no transmission takes place, so that T1 exerts no influence. The accuracy of the entire time switch device is thus considerably greater than that of the threshold switch following the electrometer valve. Quite apart from the favourable properties of this type of valve, such as higher insulation resistance, the use of an electrometer valve in the ampifier stage covered by these examples is particularly advantageous for the circuit suggested, because it is operated at a low anode voltage, which can be taken, together with the low operating voltage for the threshold switch, from a low voltage power pack.

Figure 2:
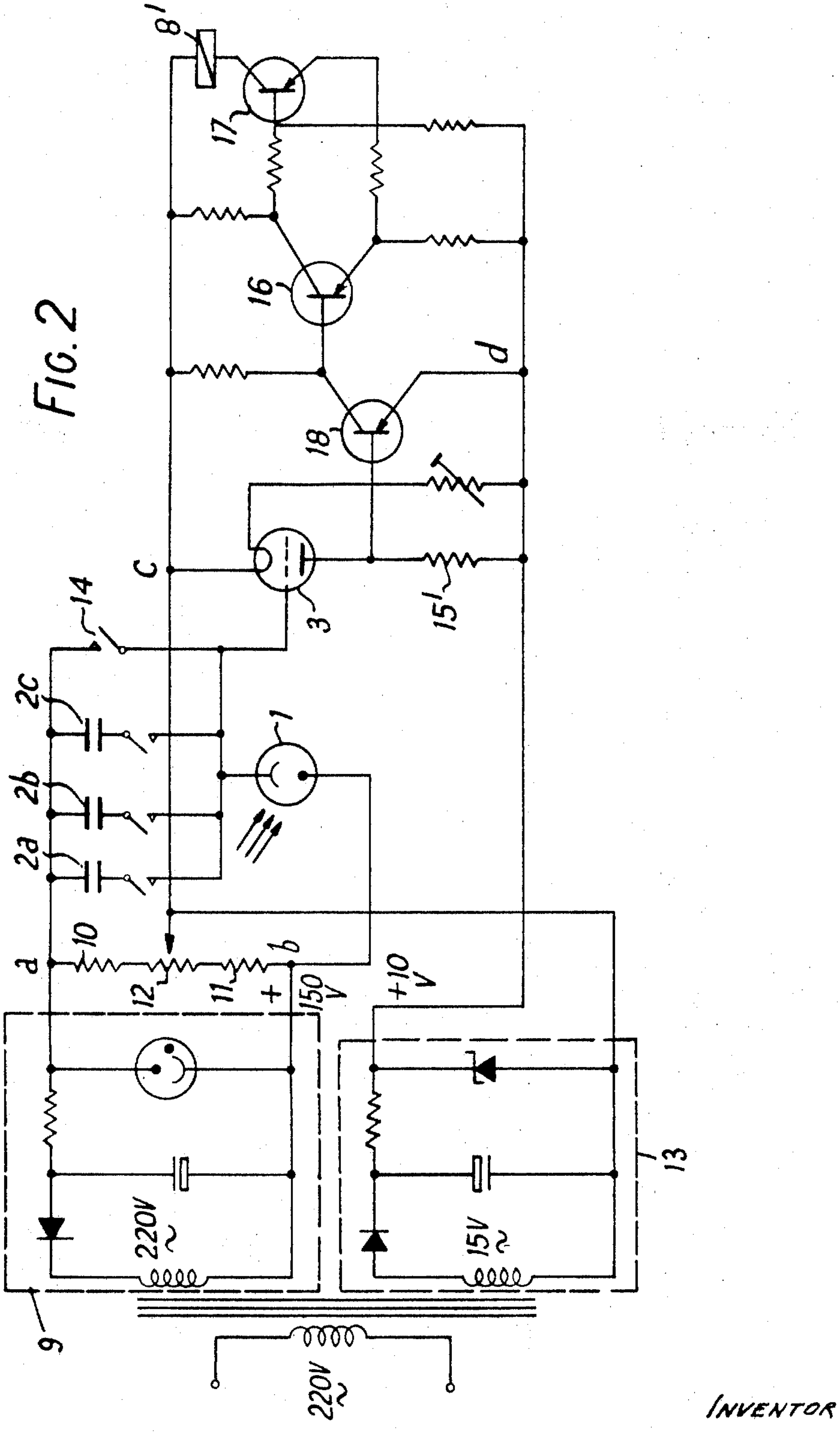
FIG. 2 shows a circuit arrangement in which the threshold switch used consists of a Schmitt trigger.

FIG. 2 shows an arrangement in which the threshold switch used consists of a flip-flop (trigger) circuit which consists of the transistors 16 and 17 and a buffer stage formed by a transistor 18 following the electrometer valve 3.

A further advantage is that the Schmitt trigger is switched over in the normal state, i.e. operates by the closure of switch 14.

This means that the transistor 16 is conductive in the normal state while the transistor 17 is cut-off. These operating conditions offer the advantage that the transistor 16 is conductive up to the moment when the switching operation takes place, as a result of which, the threshold value is rendered more closely defined.

The voltage between the base and point *d* on the transistor 16 decreases to the extent to which the voltage across the resistance 15' increases. As soon as this decreasing voltage falls below a certain threshold value the system "triggers over" so that the transistor 16 is cut-off and the transistor 17 becomes conductive. The relay 8' thus comes into operation and terminates the exposure process.

I claim:

1. A time switch circuit comprising in combination:
(a) a power source,
(b) a photoelectric cell,
(c) a time constant capacitor connected in series with said photoelectric cell across said power source,
(d) a potentiometer system also connected across the power source and having a slider thereon,
(e) an electrometer valve connected in the circuit, of which valve the grid bias voltage is determined by the voltage appearing between the slider and the junction between said photoelectric cell and said time constant capacitor,
(f) an electronic threshold switch, which changes from a first state to a second state at a predetermined input voltage, connected to the output of said electrometer valve, and
(g) a power switch connected to the output of said threshold switch; wherein the circuit values are so selected that the electrometer valve can suppress the initial part of the voltage function appearing across the time constant capacitor and can transfer the part of the voltage function in which there is a level at which said threshold switch changes from said first state to its second state.

2. A time switch circuit according to claim 1, having a second power supply which provides power for said electrometer valve and for said electronic threshold switch, and of which one of its poles is connected to the slider of said potentiometer.

3. A time switch circuit according to claim 1, wherein said threshold switch includes an oscillator of which the commencement of oscillation is inhibited until said level is reached, and said power switch comprises a thyratron and a relay of which the energising coil is connected in series with said thyratron.

4. A time switch circuit according to claim 1, wherein said threshold switch includes an electronic trigger stage, and said power switch is a relay of which the energizing coil is connected to said trigger stage to be energized thereby.

5. A time switch circuit according to claim 1, wherein further capacitors of different values from each other are provided for alternative connection in series with said photoelectric cell.

References Cited

UNITED STATES PATENTS

| | | | |
|---|---|---|---|
| 2,274,158 | 2/1942 | Penther. | |
| 2,666,858 | 1/1954 | Levine. | |
| 2,668,474 | 2/1954 | Rogers | 250—214 |
| 3,222,983 | 12/1965 | Ouchi. | |

ARCHIE R. BORCHELT, Primary Examiner

M. ABRAMSON, Assistant Examiner

U.S. Cl. X.R.

250—219